INVENTORS
WILLIAM L. LETSCH
VINCENT P. PUSATERI
BY

*H. H. Locke*
ATTORNEYS

United States Patent Office 3,098,227
Patented July 16, 1963

3,098,227
CONSTANT CLOSING VELOCITY RADAR
TARGET SIMULATOR
William L. Letsch, Baltimore, and Vincent P. Pusateri,
Laurel, Md., assignors, by mesne assignments, to the
United States of America as represented by the Secretary of the Navy
Filed Sept. 7, 1961, Ser. No. 136,681
8 Claims. (Cl. 343—17.7)

The present invention relates generally to radar signal simulation equipment and more particularly to a device for simulating the type of signal which would be received by a passive radar tracking system, from a radar transmitter having a single level of output power located in an object traveling at a constant velocity and on a collision course with the tracking system.

Those concerned with the development of test equipment for radar tracking systems have indicated a need for a device capable of providing a radar signal simulating that which would appear at the receiver of a passive tracking system had it emanated from a transmitter located in an object directly approaching the receiver at a constant velocity. For economy and convenience in testing, it is necessary that this signal simulator provide such an indication of relative motion of the transmitter with respect to the tracking system receiver without actual movement of the transmitter. The present invention fulfills this need. The power incident on a point at a distance or range D from a power radiating source such as a radar transmitter is proportional to the transmitted power divided by the square of the range D.

$$P_{incident} = K \frac{P_{transmitted}}{D^2} \text{ (where } K \text{ is a constant)} \quad (1)$$

Thus, if the transmitted power from a signal simulator can be made to vary as an inverse function of the square of the simulated distance or range D, then the transmitter (or simulator) can remain physically fixed at a particular location and yet appear to be moving toward, or "closing" on, the radar receiver of a tracking system to be tested, with a constant velocity. The power transmitted by the present invention varies in this manner and thereby permits testing and alignment of passive time-to-intercept radar tracking systems without actual physical movement of the signal simulating transmitting equipment.

To attain this desired signal simulation, an embodiment of the present invention utilizes a triangular voltage waveform as the input signal to an integrating operational amplifier and an associated diode which co-operate to produce an output signal composed of negative half-cycle parabolic voltage waveforms. This negative parabolic voltage waveform is coupled to the grid of a traveling wave tube radio frequency (R.F.) amplification circuit in order to amplitude modulate a pulsed R.F. signal being amplified by the traveling wave tube. This amplitude modulated R.F. signal is then supplied to a suitable transmitter-antenna system which radiates the simulated signal in order that it may be received by the passive radar tracking system(s) under test.

An object of the present invention is the provision of a radar signal simulation system.

Another object is to provide a system to facilitate the alignment and testing of passive radar tracking systems.

A further object is to provide a radar signal simulating test apparatus for testing and aligning passive radar tracking systems without a need for physical movement of the test apparatus relative to the tracking system.

Still another object is to provide a signal simulation system for producing a radar signal of the type which would be received by a passive radar tracking system if it had originated from a radar transmitter having a single level of output power located in an object traveling at a constant velocity and on a collision course with the tracking system, without physical motion of the simulation system.

Other objects and advantages of the invention will hereinafter become more fully apparent to those skilled in the art as the disclosure is revealed in the following detailed description of a preferred embodiment of the invention as illustrated in the accompanying sheet of drawing in which.

Figure 1:
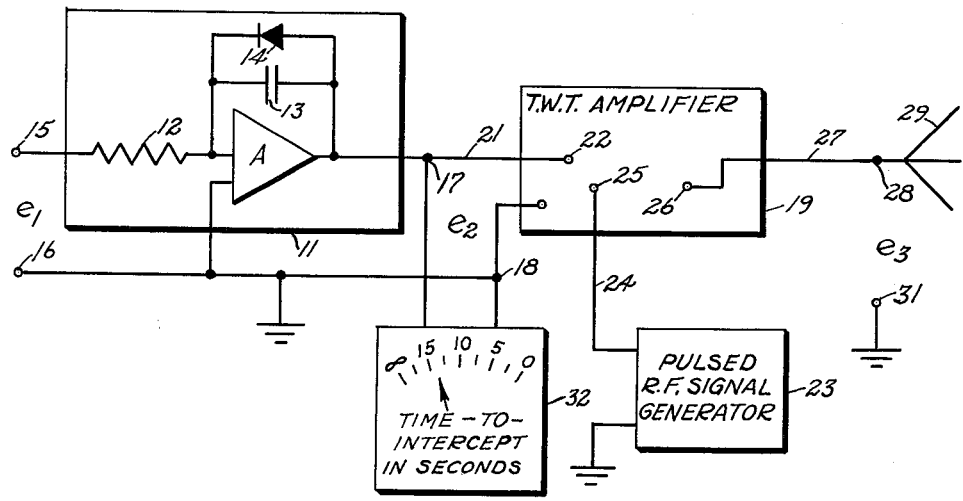
FIGURE 1 shows a block-schematic diagram of the invention.

Referring now to FIGURE 1, there is shown a specific embodiment of the invention in which section 11 is an integrating operational amplifier, many of which are well known in the art, and may be of the type disclosed by F. E. Terman in Electronic and Radio Engineering, section 18–3. "Integration and Differentiation With the Aid of Operational Amplifiers," pages 621–625, McGraw-Hill Book Company, (4th ed., 1955). An amplifier such as that shown in FIGURE 18–8(a) with the addition of a cathode-coupled output stage as suggested in note 1 of section 18—3, pages 623, is suitable. Resistance 12 and capacitance 13 shown in section 11 of FIGURE 1 of the invention correspond to resistance R and capacitance $C_{fb}$ of FIGURE 18–8(a) of Terman. Element 14 is a diode means coupled in such a manner as to eliminate all positive half-cycles of the output voltage waveform from integrating operational amplifier of section 11. Terminals 15 and 16 are input terminals to integrator 11, and terminals 17 and 18 are its output terminals. Section 19 may be any suitable grid-modulated traveling wave tube (T.W.T.) amplifier for amplitude modulating and amplifying a pulsed R.F. signal, many of which are well known in the art as evidenced by an article, "Power Supply Requirements For Traveling, Wave-Tube Amplifiers" by A. J. Cooper et al. in Engineering Notes, vol. I, No. 9, pages 77–87, Huggins Laboratories (July, 1959). The output signal of integrating amplifier 11 is coupled via conductor 21 to control grid input terminal 22 of T.W.T. amplifier circuit 19. R.F. signal generator 23 provides a pulsed R.F. signal via conductor 24 to R.F. input terminal 25 of T.W.T. amplifier 19 which has its R.F. output terminal 26 coupled via conductor 27 to input terminal 28 of transmitting antenna system 29. Reference terminal 31 is coupled to ground. Element 32 is a voltmeter coupled across output terminals 17 and 18 to meter the grid modulation voltage supplied to grid input terminal 22 of the T.W.T. amplifier 19; this meter is calibrated to read the simulated time-to-intercept in seconds from infinity to zero as the grid input voltage varies from a negative maximum to zero.

Figure 2:
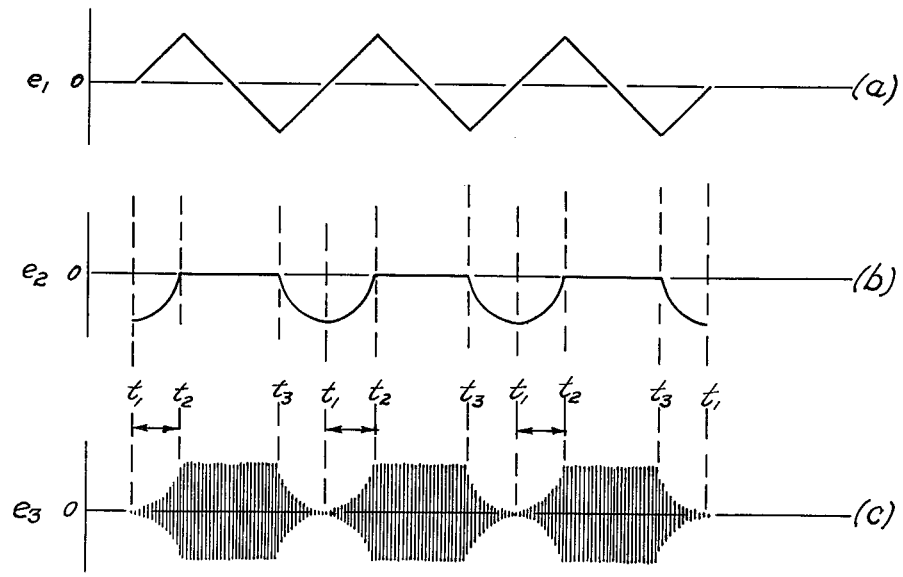
FIGURE 2 depicts voltage waveforms at various points throughout the invention.

FIGURE 2 depicts voltage waveforms as they might appear at various points throughout the circuit of FIGURE 1. FIGURE 2(a) shows waveform $e_1$ which is a triangular voltage waveform applied to terminals 15 and 16 from a triangular wave generator not a part of this invention. FIGURE 2(b) represents waveform $e_2$ which is present across output terminals 17 and 18 of integrator 11 and is composed of parabolic negative half-cycles resulting from the integration of waveform $e_1$ and the elimination of all positive half-cycles therefrom by integrating operational amplifier 11. The waveform $e_3$ shown in FIGURE 2(c) represents the pulsed R.F. signal provided by R.F. signal generator 23 as it appears across terminals 28 and 31 after it has been amplified and modulated by waveform $e_2$ in T.W.T. amplifier 19; this waveform is transmitted by antenna 29 for reception by the passive radar time-to-intercept system(s) under test.

Operation

In operation, a triangular wave generator not considered a part of this invention supplies a triangular voltage waveform to input terminals 15 and 16 of operational integrating amplifier 11. Both frequency and amplitude of this input signal are adjustable, and the rise time of the waveform $e_1$ from the zero axis to a positive maximum (corresponding to the interval from time $t_1$ to $t_2$ in FIGURE 2) will be several seconds. This very low frequency triangular wave is then integrated and amplified by operational amplifier 11 to produce a waveform composed of alternately positive and negative parabolic half-cycles. (It is well known that integration of a triangular waveform will produce a parabolic waveform; for example, see FIGURE 18-7(e) of the Terman reference, supra.) Diode 14 serves to eliminate all positive parabolic half-cycles so that the output signal from amplifier 11 present at terminals 17 and 18 is composed of negative parabolic half-cycles and appears as waveform $e_2$ shown in FIGURE 2(b). A pulsed R.F. signal is provided to R.F. input terminal 25 of T.W.T. amplifier 19 via conductor 24 from R.F. signal generator 23. This R.F. signal is amplified and at the same time is grid modulated by the parabolic signal voltage applied to grid 22 of the T.W.T. amplifier by conductor 21. The parabolically modulated R.F. signal is taken from R.F. output terminal 26 of T.W.T. amplifier 19 and conveyed via conductor 27 to transmitting antenna 29 for radiation to the passive radar tracking system(s) under test.

The amplitude of the negative parabolic modulating voltage $e_2$ is proportional to the amplitude of triangular input signal voltage $e_1$, and the time interval from $t_1$ to $t_2$ for voltage waveforms $e_2$ and $e_3$ is determined by the frequency of input voltage $e_1$. The amplitude of triangular input voltage $e_1$ is adjusted to a value which will cause the negative parabolic modulating voltage $e_2$ to bias T.W.T. amplifier 19 at a point very close to cutoff at time $t_1$; thus at time $t_1$ a minimum value of output power will be radiated from antenna 29 as shown by waveform $e_3$ in FIGURE 2(c). Time $t_1$ corresponds to the instant in which initial indication of a "closing" target would be received by a passive radar tracking system of the type to be tested by the invention. From time $t_1$ to $t_2$ the power ($P_0$) radiated by antenna 29 increases in an inverse proportion to the absolute value of parabolic modulating voltage $e_2$, $$P_0 = K_1 \frac{1}{|e_2|} \text{ when } e_2 < 0$$

where $K_1$ is a constant (2)

and since from time $t_1$ to $t_2$ modulating voltage $e_2$ follows a parabolic curve proportional to increasing time $t$ which simulates the in-flight time of the target after initial detection at time $t_1$ until "collision" with the tracking system at time $t_2$, voltage $e_2$ may be expressed as a parabolic funcion of time $t$ in the following manner, $$|e_2| = K_2 \frac{1}{t^2} \text{ from time } t_1 \text{ to } t_2$$

where $K_2$ is a constant (3)

Passive radar tracking systems of the type to be tested by the invention are constructed incorporating the assumption that any individual target is traveling at a constant velocity on a collision course with the tracking system in which case the decreasing distance or range D from the receiver of the tracking system to the target is inversely proportional to the increasing time-in-flight of the target during the period from $t_1$ to $t_2$, $$D = K_3 \frac{1}{t} \text{ where } K_3 \text{ is a constant} \quad (4)$$

substituting Equation 4 in Equation 3 provides, $$|e_2| = \frac{K_2}{K_3^2} D^2 \quad (5)$$

substituting Equation 5 in Equation 2 and combining constants, $$P_0 = K_4 \frac{1}{D^2} \text{ where } K_4 \text{ is a constant} \quad (6)$$

Equation 6 verifies that the power $P_0$ radiated from antenna 29 of the invention is inversely proportional to the square of the simulated distance or range D.

Thus during the period from $t_1$ to $t_2$ the energy $P_0$ radiated by antenna 29 will appear to the receivers of passive radar tracking systems under test as a target "closing" on these receivers at a constant velocity and transmitting a signal of constant output power, i.e. the invention remaining in a fixed physical position near the passive tracking system(s) under test and radiating a signal whose power $P_0$ increases inversely with the square of time $t$ appears to the passive radar tracking systems as would an actual target radiating a signal of constant output power but physically moving at a constant velocity on a collision course with the tracking systems.

Since the increase in radiated power $P_0$ from antenna 29 during the period from $t_1$ to $t_2$ is proportional to the instantaneous value of modulating voltage $e_2$ present across terminals 17 and 18 and thus to time $t$, voltage indicator 32 can be calibrated to show "time-to-intercept" for any given set of circuit parameters; thus during the period from time $t_1$ to $t_2$, indicator 32 will provide a meaningful indication of the decreasing number of seconds remaining before "collision" of the simulated target with the tracking system(s). If it is desirable to simulate targets having various "closing" velocities, this may be accomplished by varying the frequency and amplitude of triangular input signal $e_1$. If more than one such closing velocity is desired, indicator 32 should be a multiple scale unit having a separate scale calibrated for each set of desired input signal parameters. Since for a constant-velocity target, range D is directly proportional to intercept time, indicator 32 could also have companion scales calibrated to show the "closing" range in yards, miles, etc.

Thus it becomes apparent from the foregoing description and annexed drawing that the disclosed invention, an adaptable radar target simulator, is a useful and practical device having application in the field of military electronics. The usefulness of this device is enhanced by its ability to provide target simulation without physical movement relative to the systems under test.

Obviously many modifications and variations of the present invention are possible in the light of the above teachings. It is therefore to be understood that within the scope of the appended claims, the invention may be practiced otherwise than as specifically described.

What is claimed is:

1. A radar target simulator comprising: an integrating operational amplifier having a first input means for receiving an input signal composed of a triangular voltage waveform, and a first output means for providing an integrated and amplified output signal to subsequent circuitry; radio frequency amplifying means having a first input means for receiving radio frequency energy to be amplified and modulated, having a second input means for receiving a modulating signal coupled to said first output means of said integrating operational amplifier, and having output terminal means for providing modulated and amplified radio frequency energy to a transmitting antenna system; a signal generating means coupled to said first input means of said radio frequency amplifying means for supplying pulsed radio frequency energy thereto; and transmitting antenna means coupled to said output terminal means of said radio frequency amplifying means for radiating said modulated and amplified radio frequency energy to radar equipment to be tested.

2. A radar target simulator in accordance with claim 1 wherein said integrating operational amplifier contains means to prevent passage of all positive portions of said integrated and amplified output signal.

3. A radar target simulator in accordance with claim 2 in which said radio frequency amplifying means comprises a grid-modulated traveling wave tube amplifier circuit.

4. A radar target simulation system comprising: a first means for producing a voltage waveform composed of negative parabolic half cycles having output means for making available said voltage waveform as a modulating voltage; radio frequency amplifier means having a first input means for receiving radio frequency energy to be amplified and modulated, a second input means for receiving a modulating voltage coupled to said output means of said first means, and a radio frequency output means for providing a parabolically modulated and amplified radio frequency signal to an antenna transmitting means; a means for producing a radio frequency signal voltage coupled to said first input means of said radio frequency amplifier; a voltage indicating means coupled across the output of said first means to indicate relative changes in said modulating voltage; an antenna transmission system coupled to said radio frequency output means for radiating said parabolically-modulated and amplified radio frequency signal in order that said signal may be received by passive radar tracking systems.

5. A radar target simulation system in accordance with claim 4 wherein said first means for producing a voltage waveform composed of negative parabolic half cycles comprises an integrating operational amplifier having an input means with a source of voltage having a triangular waveform coupled thereto and a diode means coupled therein to prevent any positive portion of its integrated waveform from reaching its said output means.

6. A radar target simulation system in accordance with claim 5 wherein said radio frequency amplifier means comprises a grid-modulated traveling wave tube amplifier.

7. A radar target simulation system in accordance with claim 6 wherein said voltage indicating device contains a plurality of scales calibrated to indicate simulated time and distance.

8. A constant closing velocity radar target simulation system comprising: an integrating operational amplifier having input means for receiving a voltage having a triangular waveform and a source of said voltage coupled thereto and output means for making available to subsequent circuitry a voltage integral of the said voltage having a triangular waveform, said operational amplifier containing diode means coupled in a manner to prevent any positive value of said voltage integral from reaching said output means thereof; a voltage indicating means coupled across said output means of said operational amplifier having a plurality of scales calibrated in units of time and distance; a modulatable traveling wave tube amplifier having a modulating input means coupled to said output means of said operational amplifier for receiving a parabolic modulating voltage, having a radio frequency voltage input means for receiving a pulsed radio frequency signal from a radio frequency signal generating means coupled thereto, and having an output means for conveying a parabolically-modulated pulsed radio frequency output signal to a transmitting antenna system coupled thereto for radiation to passive radar tracking systems under test.

No references cited.